United States Patent
Kesseler et al.

(10) Patent No.: US 7,404,333 B2
(45) Date of Patent: Jul. 29, 2008

(54) SENSOR HEAD OR DETECTION HEAD AND DEVICE COMPRISING SUCH A HEAD

(75) Inventors: Manuel Kesseler, Barr (FR); Rémy Kirchdoerffer, Vufflens Le Chateau (CH)

(73) Assignee: Senstronic, Saverne (FR)

( * ) Notice: Subject to any disclaimer, the term of this patent is extended or adjusted under 35 U.S.C. 154(b) by 141 days.

(21) Appl. No.: 11/087,632

(22) Filed: Mar. 24, 2005

(65) Prior Publication Data

US 2006/0005643 A1 Jan. 12, 2006

(30) Foreign Application Priority Data

Mar. 24, 2004 (FR) .................................. 04 03041

(51) Int. Cl.
*G06K 9/00* (2006.01)
(52) U.S. Cl. .............................. 73/760; 73/493; 73/494; 73/514.39; 324/174
(58) Field of Classification Search .................. 73/493, 73/494, 514.39, 760; 324/174, 207.5
See application file for complete search history.

(56) References Cited

U.S. PATENT DOCUMENTS

| 4,647,892 A | * | 3/1987 | Hewitt | .......................... 336/83 |
| 5,486,758 A | * | 1/1996 | Hammerle | ................... 327/174 |
| 5,588,202 A | | 12/1996 | Ehlers et al. | |
| 5,744,951 A | * | 4/1998 | Babin et al. | ................... 324/173 |
| 5,998,988 A | * | 12/1999 | Dickmeyer et al. | ......... 324/174 |
| 6,075,359 A | * | 6/2000 | Van Fleet, III | ......... 324/207.15 |
| 6,205,858 B1 | * | 3/2001 | Palfenier et al. | ......... 73/514.39 |
| 6,253,614 B1 | * | 7/2001 | Steinauer et al. | ......... 73/514.39 |
| 6,392,406 B1 | * | 5/2002 | Palfenier et al. | ............ 324/174 |
| 6,850,059 B2 | * | 2/2005 | Barron et al. | ................ 324/262 |
| 2003/0107369 A1 | | 6/2003 | Ito et al. | |

FOREIGN PATENT DOCUMENTS

EP 0 626 565 11/1994

* cited by examiner

*Primary Examiner*—Edward Lefkowitz
*Assistant Examiner*—Freddie Kirkland, III
(74) *Attorney, Agent, or Firm*—Young & Thompson

(57) ABSTRACT

Sensor head or detector head (1) composed primarily of a protective casing that forms a hollow body (2) with an external surface, the so-called active surface (2'), and of a sensing or detection element mounted in the hollow body and adjacent to part of the front wall of the protective casing defining the active surface, at the level of the internal surface opposite the latter, the sensor head characterized in that the sensing element (3) is located at a distance from the internal surface (4') of the part of the wall (4) of the hollow body (2) in such a way as to delineate an interstitial space (5) of small thickness (d) forming a mechanical and physical decoupling interface between the part of the wall (4) and the sensing element (3).

14 Claims, 2 Drawing Sheets

SENSOR HEAD OR DETECTION HEAD AND DEVICE COMPRISING SUCH A HEAD

FIELD OF THE INVENTION

This invention relates to the area of sensors and detectors, especially those operating on an electromagnetic principle, such as presence or proximity detectors.

BACKGROUND OF THE INVENTION

Numerous implementations of such sensors or detectors that include an inductance or a capacitor as the sensing element are already known.

This sensing element is generally mounted in a protective box, in the immediate proximity of part of the wall of the latter, which thus comprises the active surface or detection surface of the sensor or detector.

To arrive in this immediate proximity and lose the least possible amount of effective detection distance, the sensing element is generally joined directly to the part of the wall defining said active surface.

However, in this latter case, said sensing element can be influenced by the forces or stresses to which said part of the wall may be exposed.

In certain applications, this part of the wall can, for example, be exposed to major pressure variations, significant temperature variations, to shocks, impacts or vibrations or else combinations of these different phenomena.

The sensing element is then subjected to stresses, deformations and shocks or vibrations transmitted by said part of the wall and can consequently be damaged, or in any case may see its operating characteristics modified under this influence.

Moreover, for reasons of tightness and durability, the boxes of these sensors or detectors are generally implemented from a single holder in the form of a hollow body that accommodates the sensing element or by casting this element in a coating material.

However, in a case of damage to this sensing element, the entire sensor or detector must then be replaced.

The purpose of this invention is to remedy at least some of the aforementioned disadvantages.

OBJECT OF THE INVENTION

To do this, the object of this invention is a sensor or detector head composed primarily of a protective casing that forms a hollow body with an external surface, the so-called active surface, and of a sensing or detection element mounted in said hollow body and adjacent to part of the front wall of the protective casing defining said active surface, at the level of the internal surface opposite the latter, the sensor head characterized in that the sensing element is located at a distance from the internal surface of said part of the wall of the hollow body in such a way as to delineate an interstitial space of small thickness forming a mechanical and physical decoupling interface between said part of the wall and said sensing element.

Thus, based on the invention, a decoupling and compensation or absorption interface between the pertinent part of the wall and the sensing element is provided that prevents transmission of the stresses or deformations between these two components while maintaining a minimum distance between them.

The object of the invention is likewise a sensing or detection device formed by a main box with a housing that is open towards the outside and that is suited to accommodating a measurement or detection head, a device characterized in that said head consists of a sensor or detection head of the aforementioned type, with a hollow body in the form of a cap, said head being mounted, preferably in a fitted manner and with the capacity to be removed, in said housing with the part of the front wall flush with its external active surface.

Due to its modular construction (head+main box), the sensor or detection device will be easier to manufacture (parts manufactured separately, then assembled) and will allow greater flexibility of use and operation (interchangeability of heads of different types, operating according to different principles) while maintaining a good level of standardization.

BRIEF DESCRIPTION OF THE DRAWINGS

The invention will be better understood from the following description that relates to one preferred embodiment given as a nonlimiting example and explained with reference to the attached diagrammatic drawings in which.

DETAILED DESCRIPTION OF THE INVENTION

As the attached figures show, the sensor or detector head 1 is composed essentially of a protective casing 2 that forms a hollow body with an external surface, the so-called active surface 2', and of a sensing or detection element 3 mounted in said casing 2 and adjacent to part of the front wall 4 of the protective casing defining or supporting said active surface 2', at the level of the internal surface 4' opposite the latter.

According to the invention, the sensing element 3 is located at a distance from the internal surface 4' of said part of the wall 4 of the casing 2 in such a way as to delineate an interstitial space of small thickness d forming a mechanical and physical decoupling interface between said part of the wall 4 and said sensing element 3.

Figure 1:
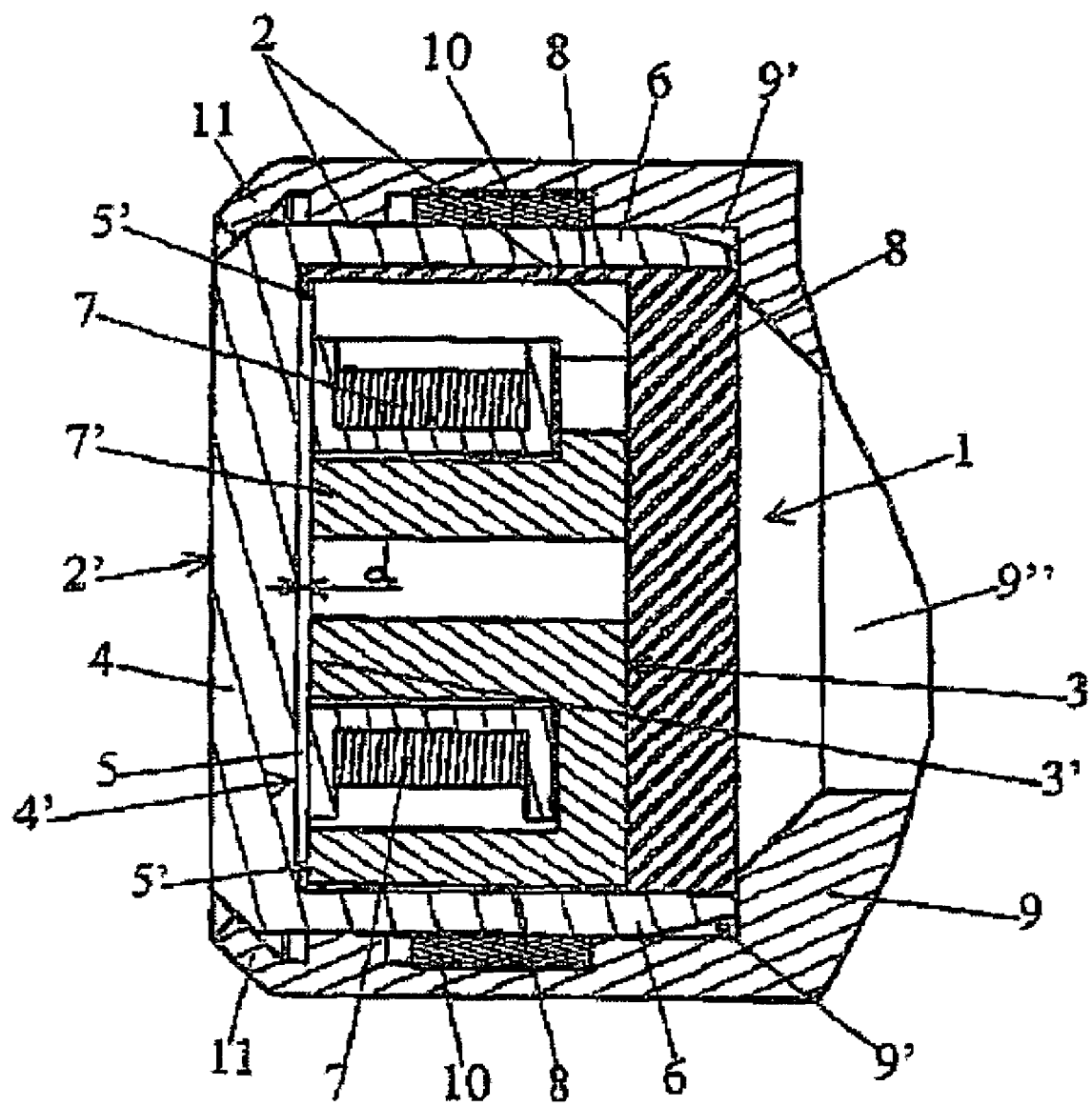
FIGS. 1 and 2 are a partial side elevation view and a cutaway view of a sensing and detection device comprising a sensing or detection head according to two embodiments of the invention.

As FIG. 1 of the attached drawings shows, the interstitial space 5 can be defined by one spacing or separating element or elements 5' formed by a single holder on the internal surface 4' or on the sensing element 3 or in the form of inserted, separate pieces that determine the positioning of said sensing element 3 at a distance relative to said internal surface 4' of part of the wall 4 and that are preferably located on the periphery of said interstitial space.

The spacing element 5' will be able, for example, to consist of a ring or blocks (possibly combined into one piece) formed by molding on one of the sensing element 3 or wall 4 or connected separately.

Moreover, the spacing element 5' that extends peripherally between sensing element 3 and wall 4 will be able to consist of a slightly deformable, electrically insulating material in such a way as to obtain electrical insulation between the element 3 and the surface 4'.

According to a first embodiment shown in FIG. 1, the interstitial space 5 is empty and forms a thin layer of air or gas between the internal surface 4' of part of the wall 4 and the surface opposite the sensing element 3.

Figure 2:
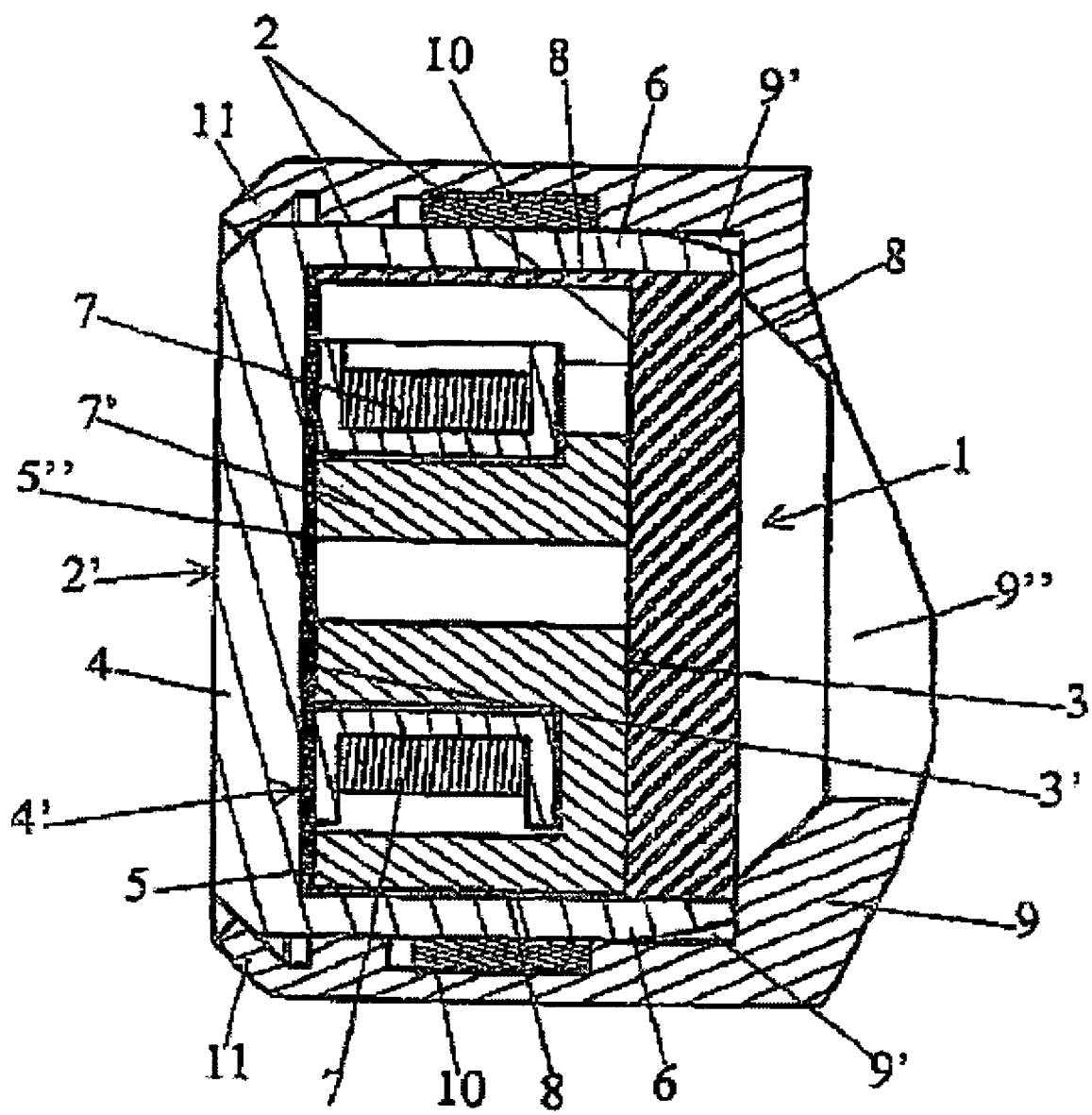

According to a second embodiment shown in FIG. 2, the interstitial space 5 is at least partially filled with an intermediate layer 5" of a flexible and/or elastically deformable material, forming an intermediate contact layer between part of the wall 4 and the surface opposite the sensing element 3.

In this second embodiment, the spacing element 5' can be omitted.

The intermediate layer 5" preferably has shock and/or vibration absorbing and/or damping properties, as well as electrical insulation properties, and connects the operating surface or reference surface 3' of said sensing element 3 to said internal surface 4' of said part of the wall 4.

According to a first variant embodiment, the intermediate layer 5" can be composed of a layer of defined minimum thickness d (with, for example, d between 0.5 and 2 mm) of a resilient material, preferably applied by coating and with adhesive or sticky properties.

According to a second variant embodiment of the invention, the intermediate layer 5" is composed of a portion of a sheet or plate material, for example with an alveolar structure, closely combined with the internal surface 4' of the pertinent part of the wall 4 of the protective casing 2, on the one hand, and with the pertinent surface 3' of the sensing element 3, on the other hand, for example by bonding.

In an alternative or complementary manner with respect to the two aforementioned variants, it can be provided that the intermediate layer 5" filling the interstitial space 5 consists of a film or sheet of electrically insulating material with a small, uniform thickness, such as, for example, a film or sheet of plastic material, such as a polyvinyl chloride or polyester.

According to one characteristic of the invention that leads to a simple and advantageous embodiment, the casing 2 has a cap structure, with a circular, rectangular or other section, the essentially flat front part of the wall 4 that forms the bottom of said cap being lengthened by one or more parts of the side wall(s) 6, extending, for example, essentially perpendicular to said bottom.

The sensing element 3 is advantageously electrically insulated relative to the casing 2, i.e., at least relative to the internal surface 4' of part of the front wall 4 and relative to the part or parts of the side wall(s) 6.

Preferably, the electrical insulation between the sensing element 3 and the side wall 6 is accomplished by a continuous layer of an electrically insulating material such as a film or a sheet of a plastic material, for example polyvinyl chloride or polyester, or else an insulating surface coating applied to the inside surface opposite the side wall 6 (not shown specifically in the figures).

As the figures of the attached drawings show, the sensing element 3 consists of a detection coil 7 mounted on a ferrite body 7', and it is supported and kept in said casing 2, for example made of stainless steel, by a filling material 8, such as a resin or the like (especially a polyurethane resin), the latter entirely covering said sensing element 3 except for its surface 3' turned toward part of the wall 4 defining the active surface.

Said resin can be injected, for example, under pressure into the hollow body.

The object of this invention is likewise, as the attached figures also show, a sensor device or detection device formed by a main box 9 with a housing 9' that is open to the outside and that is suited for the accommodation of a measurement or detection head.

This device is characterized in that said head 1 consists of a sensor or detection head such as described above, with a casing 2 in the form of a cap, said head 1 being mounted preferably in a fitted manner and with the capacity to be removed, in said housing 9' with the part of the front wall 4 flush with its active external surface 2'.

Preferably and to allow stationary mounting of the head 1 without the need for an additional fixing element, said head 1 can be kept by crimping in the housing corresponding to the main box, a lateral peripheral seal 10 being present around the casing 2 between the side wall or walls 6 of the latter and the internal wall or walls of the housing 9' for mounting the main box 9.

Fitted mounting of the head 1 in the housing 9' at the level of its side walls 6 and its support in depth by abutment of the free edges of said walls 6 on the bottom of said housing 9' (for example at the level of a particular circular shoulder as shown in the figures) will ensure very precise mounting of the head 1, even in the case of changing or replacing it.

Moreover, crimped holding (ensuring only that the head 1 is kept in the housing 9', the head 1 already being supported in the other directions) optimizes manufacturing and maintenance costs, the holding tabs 11 or the like of the box 9 being advantageously supported on a chamfered edge of the hollow body 2 without passing beyond the plane of the active surface 2'.

Crimping can be accomplished by discontinuous means (tabs) or by a continuous means such as a tube peripherally folded onto the casing 2. The latter and the tabs or the tube are advantageously made of stainless steel.

Advantageously, the peripheral seal 10 consists of an annular compression seal that is able to resist compressive forces, especially those greater than several hundred bars, partially housed in a circumferential groove made in the side walls of the housing 9 and highly compressed by the casing 2.

This seal can consist of, for example, a flat cylindrical seal (as shown by the figures) of fluorocarbon (FKM).

As the attached figures show, the housing 9' includes an opening 9''' toward the interior of the main sealed box 9, the latter advantageously having a rigid, elongated cylindrical shape and containing additional components that ensure the feed or the excitation of the sensing element 3 and/or at least pre-processing of the signals delivered by the latter during the measurement or detection phases that follow the excitation phases.

Thus, the invention makes available a sensor head or detection head with a sensing element 3 that, while being effectively protected and accurately positioned in said head 1, is mechanically and structurally decoupled from its protective casing 2 at the level of its opposite surfaces or their mutual zone of contact. For this reason, the stresses, deformations and shocks affecting the pertinent part of the wall 4 of the casing are filtered or absorbed before they reach said sensing element 3, or are quite simply not transmitted.

Moreover, the modular composition of the sensing or detection device makes manufacture and maintenance easier.

Of course, the invention is not limited to the embodiment described and shown in the attached drawings. Modifications are possible, especially from the standpoint of the composition of various components or by substitution of technical equivalents, without thereby departing from the field of protection of the invention.

The invention claimed is:

1. Sensor composed primarily of a protective casing that forms a hollow body with an external active surface and of a sensing element mounted in said hollow body and adjacent to one part of a front wall of the protective casing defining said active surface, the sensing element (3) being located at a distance from the internal surface (4') of said part of the wall (4) of the hollow body (2) in such a way as to delineate an interstitial space (5) of small thickness (d) forming a mechanical and physical decoupling interface between said part of the wall (4) and said sensing element (3), and wherein the interstitial space (5) is at least partially filled with an intermediate layer (5") of a flexible and elastically deformable alveolar material having shock and vibration absorbing and damping properties, forming an intermediate contact layer between part of the wall (4) and the surface opposite the sensing element (3).

2. Sensor according to claim 1, wherein the interstitial space (5) is defined by one spacing or separating element(s) (5)' formed by a single holder on the internal surface (4') or on the sensing element (3) or in the form of inserted, separate piece(s) that determine the positioning of said sensing element (3) at a distance relative to said internal surface (4') of part of the wall (4) and preferably located on the periphery of said interstitial space.

3. Sensor according to clam 1, wherein the intermediate layer (5") connects an operating surface or reference surface (3') of said sensing element (3) to said internal surface (4') of said part of the wall (4).

4. Sensor according to claim 3, wherein the intermediate layer (5") is composed of a layer of defined minimum thickness (d) of a resilient material applied by coating and with adhesive or sticky properties.

5. Sensor according to claim 1, wherein the intermediate layer (5") is composed of a layer of defined minimum thickness (d) of a resilient material applied by coating and with adhesive or sticky properties.

6. Sensor according to claim 1, wherein the intermediate layer (5") is composed of a portion of a sheet or plate material, for example with an alveolar structure, closely combined with the internal surface (4') of an adjacent part of the wall (4) of the protective casing (2), on the one hand, and with the pertinent surface (3') of the sensing element (3), on the other hand, for example by bonding.

7. Sensor according to claim 1, wherein the intermediate layer (5") filling the interstitial space (5) consists of a film or a sheet of electrically insulating material with a small, uniform thickness, such as, for example, a film or a sheet of plastic material, such as vinyl polychloride.

8. Sensor according to claim 1, wherein the hollow body (2) has a cap structure, with a circular, rectangular or other section, the part of the front wall (4) that is essentially flat and that forms a bottom of said cap being lengthened by one or more parts of side wall(s) (6), extending, for example, essentially perpendicular to said bottom.

9. Sensor according to claim 8, wherein the sensing element (3) is electrically insulated relative to the hollow body (2), at least relative to the internal surface (4') of part of the front wall (4) and relative to the part or parts of the side wall(s) (6).

10. Sensor according to claim 9, wherein electrical insulation between the sensing element (3) and the side wall (6) is accomplished by a continuous layer of an electrically insulating material such as a film or a sheet of a plastic material, for example, vinyl polychloride, or else an insulating surface coating applied to the surface opposite the side wall (6).

11. Sensor according to claim 1, wherein the sensing element (3) consists of a detection coil (7) mounted on a ferrite body (7') and wherein it is supported and kept in said hollow body (2), for example made of stainless steel, by a filling material (8), such as a resin or the like, the latter entirely covering said sensing element (3) except for the interstitial space (5).

12. Sensor according to claim 1, formed by a main box with a housing that is open towards the outside and that is suited to accommodating said sensor with said hollow body (2) in the form of a cap, said sensor being mounted in said housing (9') with part of said front wall (4) flush with its external active surface (2'), and wherein said sensor is kept by crimping in the housing corresponding to a main box, a lateral peripheral seal (10) being present around the hollow body (2) between a side wall or walls (6) of the hollow body (2) and an internal wall or walls of the housing (9') for mounting the main box (9).

13. Device according to claim 12, wherein the peripheral seal (10) consists of an annular compression seal that is able to resist compressive forces, especially those greater than several hundred bars.

14. Device according to claim 12, wherein the housing (9') includes an opening (9") toward the interior of a main sealed box (9), the latter advantageously having a rigid, elongated cylindrical shape and containing additional components that ensure the feed or the excitation of the sensing element (3) and/or at least pre-processing of the signals delivered by the latter during the measurement or detection phases that follow the excitation phases.

* * * * *